UNITED STATES PATENT OFFICE.

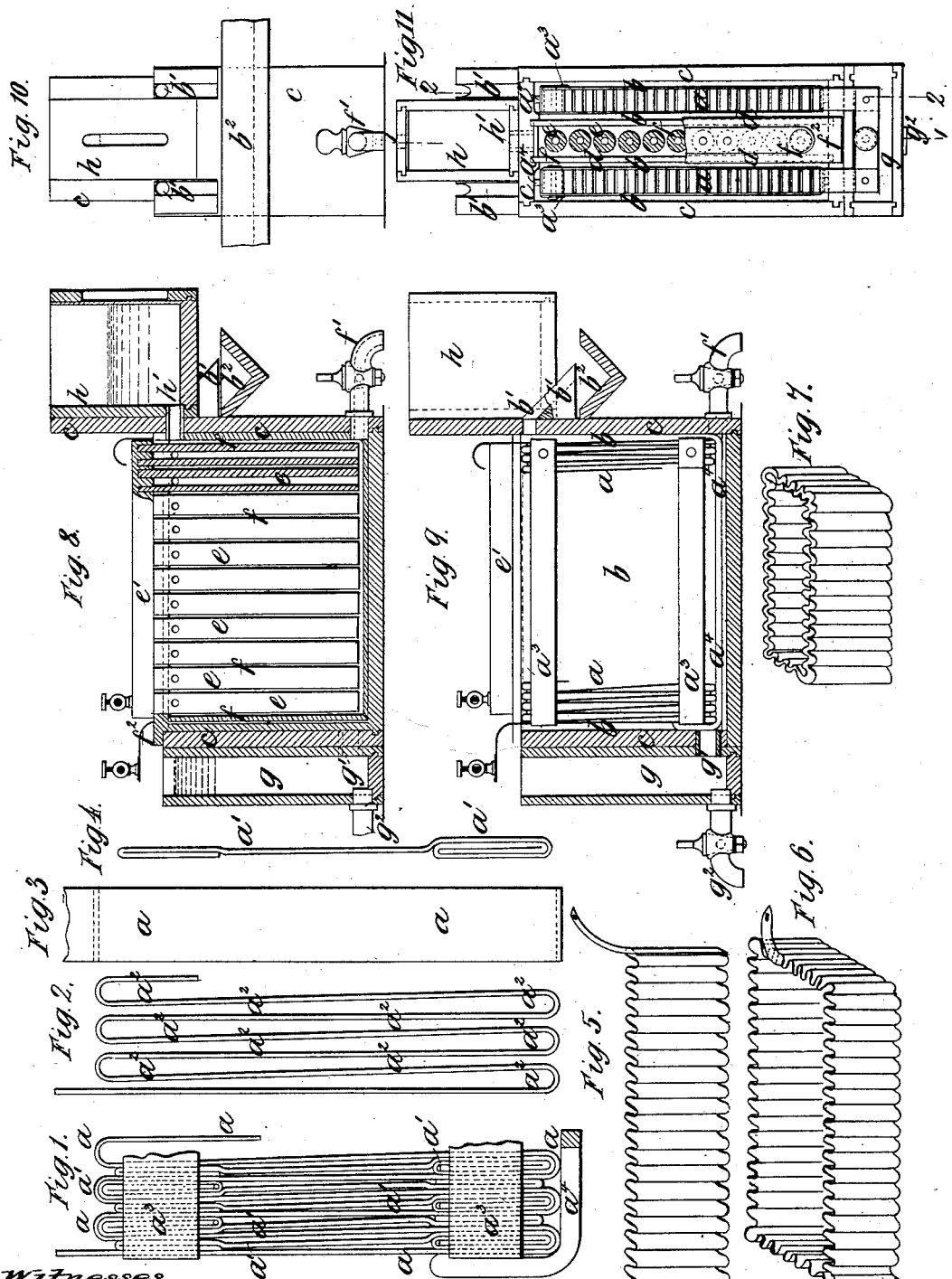

PAUL RAOUL DE FAUCHEUX D'HUMY, OF LONDON, ENGLAND.

GALVANIC BATTERY.

SPECIFICATION forming part of Letters Patent No. 367,705, dated August 2, 1887.

Application filed November 12, 1885. Serial No. 182,601. (No model.) Patented in England September 17, 1884, No. 12,516.

*To all whom it may concern:*

Be it known that I, PAUL RAOUL DE FAUCHEUX D'HUMY, electrical engineer, a citizen of the Republic of France, and a resident of London, England, have invented new and useful Improvements in Galvanic Batteries, (for which I have obtained a patent in Great Britain, No. 12,516, bearing date September 17, 1884,) of which the following is a specification, reference being had to the accompanying drawings.

This invention relates to improvements whereby I produce a non-polarizing galvanic battery. For this purpose I employ two elements or poles in direct combination with pure water. The metal element is wrought or cast iron or steel, and should be formed with a very extended surface. It may contain or be plunged in water. I prefer the above metals for my battery; but other metals may be employed.

In carrying my invention into effect I employ ribbons of iron or steel folded upon themselves as many times as is necessary, either vertically or horizontally, and spirally or any other form. The iron or steel I employ should be very ductile, as pure as possible from carbon and sulphur, and should be of long fiber. I use also corrugated iron or steel in a single piece. The carbon element should have also a very extended surface, either plain, tubular, grooved, or of various hollow forms. It may contain or be plunged in the depolarizing-liquid. I also employ for the second element flexible carbons in the form of ribbons or of round wicks arranged in the same way as that above described for the metal element. These flexible carbon ribbons or wicks may be rolled upon themselves in spiral form or folded vertically or horizontally. In this case the carbon element is plunged in the depolarizing-liquid contained in a porous vase or in a hollow carbon or in any other vase. One extremity of the metal element and one extremity of the carbon element will form the two poles. The depolarizing-liquid may be pure nitric acid, or sulphuric acid and nitric acid, or sulphuric acid and nitrate of soda, or nitric acid mixed with water. The carbon pole immersed in the porous vase or containing the depolarizing-liquid is plunged in pure water contained by or in which is immersed the metal element. The action of endosmose taking place, a very light chemical reaction is generated. The water decomposing produces weak oxide of iron. This oxide does not become attached to the iron, but only mixes with the mass of the water, of which each molecule is saturated with iron, and becomes itself metallic and augments still further the metallic surface. The metal never requires cleaning. The decomposition of the depolarizing-liquid being extremely slow, the water being renewed in order to prevent all acidulation of this liquid, the metal never being covered with oxide, and its reduction being very slow, no polarization takes place. An energetic electric current is obtained. It is absolutely constant or without appreciable variation of intensity or electro-motive force.

I can employ other metals on condition that they be immersed in or contain pure water and are provided with very extended surfaces, as above described. The depolarization varies according to the metal used.

In order that my said invention may be more clearly understood and readily carried into effect, I will proceed, aided by the accompanying drawings, more fully to describe the same.

In the drawings, Figures 1 to 7 show different views of various plans of forming the metal element of my improved galvanic battery, and Figs. 8 and 9 are longitudinal sections drawn on the lines 1 1 and 2 2 of Fig. 11, showing a battery constructed according to my invention. Fig. 10 is an end view, and Fig. 11 is a plan of the same.

My invention relates to improvements whereby I produce a non-polarizing galvanic battery. For this purpose I employ two elements or poles in direct combination with pure water and arranged and constructed in the manner hereinafter described, and represented in the accompanying drawings. The metal element I prefer to employ is wrought or cast iron or steel, and it should be formed with a very extended surface, and it may be constructed to contain water, as shown at Fig. 7, or it may be plunged into water, as represented in the other figures of the drawings.

Although I prefer the above metals for my battery, other metals may be employed, provided they are immersed in or contain pure water and are provided with very extended surfaces, as herein described.

The depolarization varies according to the metal used.

In carrying my invention into effect I form the metal element of a ribbon or ribbons of iron or steel folded upon themselves as many times as is necessary to produce the extent of surface desired, and either in a vertical direction, as shown in Figs. 1 to 4, or in a horizontal direction, as shown in Figs. 5 and 6, or spirally, or in any other form. In the form of element shown in Figs. 1 to 4 a ribbon, $a$, of metal is folded into the form shown in Figs. 2 and 3, other ribbons, $a'$, of metal are folded into the form shown in Fig. 4. The latter are inserted alternately in one direction and then in the other within the spaces $a^2$ in the folded ribbon shown in Fig. 2, and bands $a^3$ of metal are passed around such combined ribbons $a\ a'$ at the upper and lower parts thereof, as shown in Figs. 1, 9, and 11, in order to connect all the parts of the metal element together. A yoke, $a^4$, at the lower part also assists to bind the parts together.

The metal element shown in Figs. 5 and 6 consists of a ribbon of metal folded horizontally upon itself into the desired form, while that shown in Fig. 7 is cast into the desired form.

The ribbon of iron or steel employed should be very ductile, as free as possible from carbon and sulphur, and should be of long fiber. The carbon element should have also a very extended surface, either plain or tubular, as shown in Figs. 8 and 11, or grooved or of various hollow forms, and it may be constructed to contain or to be plunged in the depolarizing-liquid. I also employ for the second element flexible carbons in the form of round wicks or ribbons arranged in the same way as that above described for the metal element. These flexible carbon wicks or ribbons may also be rolled upon themselves in spiral or other form, or folded vertically or horizontally. In this latter case the carbon element is plunged in the depolarizing-liquid contained in a porous vase or in a hollow carbon, or in any other vase. One extremity of the metal element and one extremity of the carbon element will form the two poles.

The depolarizing-liquid may be pure nitric acid, or sulphuric acid and nitrate of soda, or nitric acid mixed with water.

The carbon pole, immersed in the porous vase or constructed to contain the depolarizing liquid, is plunged in pure water contained by the metal element or in which the metal element is immersed. The action of endosmose taking place, a very light chemical reaction is generated. The water decomposing produces weak oxide of iron. This oxide does not become attached to the iron, but only mixes with the mass of the water, of which each molecule is saturated with iron and becomes itself metallic, and augments still further the metallic surface. The metal, moreover, never requires cleaning, as the surface thereof never becomes foul or clogged. The decomposition of the depolarizing-liquid being extremely slow, the water being renewed in order to prevent all acidulation of this liquid, the metal never being covered with oxide, and its reduction being very slow, no polarization takes place. An energetic electric current is obtained. It is absolutely constant or without appreciable variation of intensity or electro-motive force.

In Figs. 8 to 11 I have shown a galvanic battery which efficiently accomplishes the object of my invention. In these figures, $a\ a$ represent the metal elements, which are similar to that shown in Fig. 1, and are connected at one end to a cross-strip of metal, on which a terminal is mounted. They are contained in chambers $b$, formed by the sides and ends of the outer vessel, $c$, and by slabs or plates $d$ of porous earthenware or carbon. The carbon element consists of a collection of tubes, $e$, perforated with small holes at the upper ends to allow the air therein to escape and permit the depolarizing-liquid to run up into the interior thereof.

The tubes $e$ are connected together by a metal cap, $e'$, cast or otherwise fixed at their upper ends, and such element is contained in a chamber, $f$, formed by the porous plates $d$ and by the ends of the outer vessel, $c$. Water is supplied to the chambers $b$ from the outer chamber, $g$, from which the water flows into the chambers $b$ through the tubes $g'$, and the waste water is run off by the tap $g^2$. Any overflow from the chambers $b$ is run off therefrom by the channels $b'$ into the trough $b^2$, whence it is conducted away. The depolarizing-liquid is fed to the chamber $f$ from the reservoir $h$ through the tube $h'$, and the chamber $f$ is emptied, when required, by drawing off the contents thereof by the tap $f'$. The chamber $f$ is hermetically sealed at the top by the cover $f^2$, or it may be closed by a loose cover, which, in some cases, may carry the carbons.

What I claim is—

1. In a galvanic battery, the combination of an element or electrode of carbon, nitric acid, an element or electrode of cast or wrought iron or steel, pure water separated from said acid by a porous partition, and a water-supply for preventing or diminishing acidulation of said water by the percolation of said acid through said porous partitions.

2. In a galvanic battery, the combination of a water-receptacle, a tank or vessel from which pure water is passed into said receptacle, an element or electrode of cast or wrought iron or steel in contact with said water, a depolarizing-liquid separated from said water by a porous partition, and a carbon element or electrode in contact with said depolarizing-liquid.

3. In a galvanic battery, the combination of a negative element composed of carbon immersed in nitric acid, a positive element composed of cast or wrought iron or steel immersed in water, said water being separated from said acid by a porous partition, and means, substantially as described, for renewing or replacing said water.

4. In a galvanic battery, the combination of a vessel divided into chambers or compartments by porous partitions, a metallic element or electrode placed in one of said chambers in contact with pure water, and a carbon element or electrode placed in another of said chambers in contact with a depolarizing-liquid, substantially as and for the purpose described.

5. In a galvanic battery, the combination of the vessel $c$, having receptacles $b\ b$ for water, and a receptacle, $f$, for a depolarizing-liquid, folded metallic elements $a\ a'$, placed in the water contained in the receptacles $b$, and carbon elements $e\ e$, placed in the depolarizing-liquid in the receptacle $f$, substantially as described.

6. In a galvanic battery, the combination of a water-receptacle, iron or steel elements $a\ a'$, immersed therein, bands $a^3$, for connecting said elements, a receptacle for a depolarizing-liquid, and a carbon element immersed therein, substantially as described.

7. In a galvanic battery, the combination of the vessel $c$, having receptacles $b\ b$ for water, and a receptacle, $f$, for a depolarizing-liquid, folded metallic elements $a\ a'$, placed in the water contained in the receptacles $b$, and carbon elements $e\ e$, placed in the depolarizing-liquid in the receptacle $f$, substantially as described.

In testimony whereof I have hereunto signed my name in the presence of two subscribing witnesses.

PAUL RAOUL DE FAUCHEUX D'HUMY.

Witnesses:
DAVID YOUNG,
    45 *Southampton Buildings*, *W. C.*
JOHN E. BOUSFIELD.